US010793753B2

(12) United States Patent
Tran et al.

(10) Patent No.: US 10,793,753 B2
(45) Date of Patent: Oct. 6, 2020

(54) VISBREAKING PROCESS

(71) Applicant: BOREALIS AG, Vienna (AT)

(72) Inventors: Tuan Anh Tran, Linz (AT); Marc Knaepen, Landen (BE)

(73) Assignee: BOREALIS AG, Vienna (AT)

( * ) Notice: Subject to any disclaimer, the term of this patent is extended or adjusted under 35 U.S.C. 154(b) by 112 days.

(21) Appl. No.: 16/095,421

(22) PCT Filed: Apr. 21, 2017

(86) PCT No.: PCT/EP2017/059531
§ 371 (c)(1),
(2) Date: Oct. 22, 2018

(87) PCT Pub. No.: WO2017/182636
PCT Pub. Date: Oct. 26, 2017

(65) Prior Publication Data
US 2019/0136100 A1 May 9, 2019

(30) Foreign Application Priority Data
Apr. 22, 2016 (EP) .................................... 16166712

(51) Int. Cl.
C08F 8/50 (2006.01)
C09J 123/08 (2006.01)
C08F 210/02 (2006.01)
C08F 10/02 (2006.01)
C08F 210/16 (2006.01)
C08K 5/00 (2006.01)
C08L 23/26 (2006.01)

(52) U.S. Cl.
CPC ........... C09J 123/0815 (2013.01); C08F 8/50 (2013.01); C08F 10/02 (2013.01); C08F 210/02 (2013.01); C08F 210/16 (2013.01); C08K 5/0016 (2013.01); C08F 2500/01 (2013.01); C08F 2500/03 (2013.01); C08F 2500/07 (2013.01); C08F 2800/20 (2013.01); C08F 2810/10 (2013.01); C08L 23/26 (2013.01); C08L 2023/42 (2013.01); C08L 2023/44 (2013.01); C08L 2314/06 (2013.01)

(58) Field of Classification Search
CPC ........ C08F 8/50; C08F 2810/10; C08F 10/02; C08F 210/16; C08F 210/02; C08F 2500/01; C08F 2500/03; C08F 2500/07; C08F 2800/20; C08F 2500/12; C08L 2023/42; C08L 2023/44; C08L 2314/06; C08L 23/26; C09J 123/0815; C09J 2201/61; C08K 5/0016
See application file for complete search history.

(56) References Cited

U.S. PATENT DOCUMENTS

| 5,021,257 A | 6/1991 | Foster et al. | |
| 6,183,863 B1 * | 2/2001 | Kawachi | B32B 27/306 428/355 AC |
| 8,247,696 B2 * | 8/2012 | Smedberg | C08F 210/02 174/120 R |
| 2004/0045666 A1 | 3/2004 | Gong et al. | |
| 2004/0236041 A1 * | 11/2004 | Higuchi | C08J 5/18 526/91 |
| 2007/0007680 A1 | 1/2007 | Barre et al. | |
| 2015/0274873 A1 | 10/2015 | Kasper et al. | |

FOREIGN PATENT DOCUMENTS

| EP | 0728796 A2 | 8/1996 | |
| EP | 0980877 A2 | 2/2000 | |
| EP | 2883887 A1 * | 6/2015 | ............ C08F 210/16 |
| EP | 2883887 A1 | 6/2015 | |
| EP | 2894195 A1 | 7/2015 | |
| RU | 2008127170 | 1/2010 | |
| WO | 2004113438 A1 | 12/2004 | |
| WO | 2007025640 A1 | 3/2007 | |
| WO | 2009012523 A1 | 1/2009 | |
| WO | 2010002670 | 1/2010 | |
| WO | 2013055446 A1 | 4/2013 | |
| WO | 2014090628 A1 | 6/2014 | |

OTHER PUBLICATIONS

Harlin, Polymer Degradation and Stability, 42, (1993) p. 89-94 (Year: 1993).*
International Search Report and Written Opinion dated Jun. 2, 2017 in International Application No. PCT/EP2017/059531 (10 pages).
International Preliminary Report on Patentability dated Nov. 1, 2018 in International Application No. PCT/EP2017/059531 (7 pages).
Search report dated Jun. 10, 2020 in corresponding Russian Application 2018140734 (2 pages).

* cited by examiner

Primary Examiner — Robert C Boyle
(74) Attorney, Agent, or Firm — Meunier Carlin & Curfman LLC

(57) ABSTRACT

A process for increasing $MFR_2$ of a polyethylene copolymer or an ethylene plastomer or elastomer comprising: (I) extruding a copolymer of polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a non-peroxide radical initiator so as to produce a polyethylene copolymer having an $MFR_2$ of 200 g/10 min or more, or an ethylene plastomer or elastomer having a $MFR_2$ of 200 g/10 min or more.

11 Claims, 2 Drawing Sheets

VISBREAKING PROCESS

The present invention relates to a visbreaking process for significantly increasing the MFR$_2$ of a polyethylene copolymer, ethylene plastomer or an ethylene elastomer and relates to the polyethylene copolymer or ethylene plastomer or ethylene elastomer obtained in this process. The products of the process find utility, inter alia, as hot melt adhesives. In particular, the inventors have found that using a specific radical initiator and by varying the amounts of that initiator, the screw speed and the extruder output within the extruder, the MFR of the visbroken polymer can be controlled. Moreover, the inventors have found that the energy inputted into the extruder during the visbreaking process is correlated to the final MFR of the visbroken polymer.

BACKGROUND

Hot melt adhesives (HMAs) are used in many areas of commerce such as bookbinding, consumer and industrial packaging, diapers, furniture, footwear and the like.

HMAs comprises a polymer base resin as a main component. This component is optionally combined with one or more tackifiers and/or plasticizers. Suitable polymer base resins are high molecular weight polymers which provide the mechanical properties of the adhesive. Such polymers include ethylene vinyl acetate (EVA), styrenic block copolymers (like styrene-isoprene-styrene SIS, or styrene-butadiene-styrene SBS), low density polyethylene, atactic polypropylene, reactive polyurethanes, polyamides, polyesters and homogeneous linear ethylene/α-olefin copolymers.

Tackifiers are added to provide and enhance the adhesion properties of the adhesive. Excellent compatibility is needed between the tackifier and the polymer base resin to ensure a homogeneous product.

Plasticizers are often added to control (or reduce) the viscosity of the blends and enable the adhesive to be handled by simple machines. The addition of waxes, fillers, colour pigments and stabilisers is also possible.

EVA is so far one of the most commonly used polymer base resins for hot melt adhesive applications. Whilst it performs well, this material has disadvantages, such as the presence of vinyl acetate (VA) in the polymer structure. VA causes issues with odour, volatile and emissions. In addition, due to the content of VA, the polarity of EVA copolymers is high. This can cause significant compatibility issues between EVA and apolar waxes which are often employed in hot melt adhesives. A further disadvantage is the low level of moisture resistance (so low barrier property) of EVA.

Hot melt adhesives comprising polymers other than those incorporating vinyl acetate have also been disclosed in the prior art. For instance, U.S. Pat. No. 5,021,257 discloses a hot-melt adhesive composition comprising a blend of at least one substantially amorphous propylene/hexene copolymer, at least one tackifier, and at least one substantially crystalline, low viscosity hydrocarbon wax.

The present inventors sought a new type of polymer material with low Mw and high MFR which can be used instead of conventional EVA type polymer in hot melt adhesives. Whilst low Mw base resins have been employed before, these have typically been made directly in a polymerisation process. Suitable grades include those sold under the trade name Affinity by Dow. Making such high MFR polymers in a polymerisation process is difficult however due to chain transfer limitations and there is limited ability to control the MFR of the forming polymer. MFR control at these very low molecular weights is difficult and requires careful control over polymerisation conditions and catalyst properties.

There are therefore benefits in being able to take a conventional polyethylene copolymer, plastomer or elastomer and significantly increase its MFR via post-reactor visbreaking. In conventional visbreaking processes however, the increases in MFR that are observed are not ideal. We have now devised a process in which polyethylene copolymers, plastomers or elastomers can be visbroken with a remarkable increase in MFR. Moreover, we can control the MFR increase through manipulation of visbreaking parameters such as temperature, screw speed, specific energy input (SEI) and so on.

Rather than generating a very high MFR in a reactor directly therefore we utilise a lower MFR starting material and increase its MFR via visbreaking. The benefits of post reactor visbreaking are that the MFR of the final polymer can be readily adjusted. Via a direct synthesis route, changing final MFR needs careful manipulation of the catalyst and polymerisation process. It is challenging to control MFR using these parameters, whereas the visbreaking process, as we demonstrate below, is more flexible.

Moreover, the visbreaking process is applicable to different polyethylene polymers produced from different types of catalysts, reactors and polymerisation processes.

The process is also a simple one as it needs only a suitable extruder. The extruder can be installed just after the reactors in production plant.

The inventors have found that polyethylene materials having high MFR (above 200 g/10 min at 190° C. & 2.16 kg) can be prepared via a simple post reactor modification process. The inventors have found that this process leads to an incredible increase in MFR. Moreover, control over the MFR of the forming polymer can be achieved through careful control of certain parameters in that process, such as temperature, the screw speed, the extruder output and hence the overall specific energy input (SEI) to the process and radical initiator content.

Polymers of comparative low MFR can therefore be converted in polymers with very high MFR. Instead therefore of using in-reactor polymerisation we have developed a process for taking a low MFR product and reducing its molecular weight markedly. Moreover, we increase MFR and hence reduce Mw without causing crosslinking. It is often observed for polyethylene materials that visbreaking leads to crosslinking happening with both non-visbroken and visbroken polymer chains. A cross-linked polymer is more viscous thus partially defeating the purpose of the visbreaking process. It is remarkable that the process of this invention does not lead to a cross-linked polymer.

It will be appreciated that visbreaking of polymers is not new. EP-A-728796 exemplifies a process for visbreaking of polybutene in the presence of a peroxide at low temperature and screw speeds. However, the specific process of the present invention with its remarkable MFR increases and the ability to control MFR through manipulation of screw speeds, temperature and/or radical initiator content is new and leads to novel polymer species.

SUMMARY OF INVENTION

Thus viewed from one aspect the invention provides a process for increasing MFR$_2$ of a polyethylene copolymer or an ethylene plastomer or elastomer comprising:

(I) extruding a polyethylene copolymer having a density of 910 to 970 kg/m$^3$ and an MFR$_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a radical initiator which decomposes at a temperature greater than 200° C. so as to produce a polyethylene copolymer having an $MFR_2$ of 200 g/10 min or more, or an ethylene plastomer or elastomer having a $MFR_2$ of 200 g/10 min or more.

Viewed from another aspect the invention provides a process for increasing $MFR_2$ of a polyethylene copolymer or an ethylene plastomer or elastomer comprising:

(I) extruding a polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a non-peroxide radical initiator so as to produce a polyethylene copolymer having an $MFR_2$ of 200 g/10 min or more, or an ethylene plastomer or elastomer having a $MFR_2$ of 200 g/10 min or more.

Viewed from another aspect the invention provides a process for increasing $MFR_2$ of a polyethylene polymer or an ethylene plastomer or elastomer comprising:

(I) extruding in an extruder a polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a non-peroxide radical initiator so as to produce a polyethylene copolymer having $MFR_2$ of 200 g/10 min or more, or an ethylene plastomer or elastomer having a $MFR_2$ of 200 g/10 min or more;

wherein said extruder is operated with one or more of the following features:

a screw speed of 300 to 1400 rpm;

a maximum barrel temperature of at least 300° C.;

a residence time of 30 secs to 5 mins, such as 30 secs to 3 mins;

a specific energy input of at least 0.15 kWh/kg.

Viewed from another aspect the invention provides a process for increasing $MFR_2$ of a polyethylene copolymer or an ethylene plastomer or elastomer comprising:

(I) extruding a polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a radical initiator, such as a non peroxide radical initiator, so as to produce a polyethylene copolymer having an $MFR_2$ of 500 g/10 min or more, or an ethylene plastomer or elastomer having a $MFR_2$ of 500 g/10 min or more.

It is preferred if the final $MFR_2$ of the polymer which exists the extruder has an $MFR_2$ at least 3 times higher than the $MFR_2$ of the starting material. It is preferred if the final $MFR_2$ of the polymer which exists the extruder has an $MFR_2$ at least 200 g/10 min higher than the $MFR_2$ of the starting material.

Viewed from another aspect the invention provides a process for increasing $MFR_2$ of a polyethylene copolymer or an ethylene plastomer or elastomer comprising:

(I) extruding a polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min in the presence of 0.1 to 2 wt % of a non-peroxide radical initiator so as to produce a polyethylene copolymer or an ethylene plastomer or elastomer having an $MFR_2$ which is 200 g/10 min or more higher than the $MFR_2$ before extrusion.

Viewed from another aspect the invention provides the product of the process hereinbefore defined.

Viewed from another aspect the invention provides the use of the product of the process as hereinbefore defined as a hot melt adhesive or in spunbond or melt blown applications.

Viewed from another aspect the invention provides use of extruder screw speed or radical initiator content to control the $MFR_2$ of a visbroken polyethylene copolymer or ethylene plastomer or elastomer in a process in which a polyethylene copolymer having a density of 910 to 970 kg/m³ and an $MFR_2$ of 1 and 100 g/10 min or an ethylene plastomer or elastomer having a density of 855 to 910 kg/m³ and an $MFR_2$ of 0.5 and 100 g/10 min is extruded in the presence of 0.1 to 2 wt % of a radical initiator so as to produce a polyethylene copolymer having an $MFR_2$ of 200 g/10 min or more, or an ethylene plastomer or elastomer having a $MFR_2$ of 200 g/10 min or more.

Viewed from another aspect the invention provides a visbroken polyethylene copolymer composition comprising a visbroken polyethylene copolymer having a density of 910 to 970 kg/m³ and an $MFR_2$ of 200 g/10 min or more or a visbroken ethylene plastomer or elastomer having a density of 855 to 910 kg/m³ and an $MFR_2$ of 200 g/10 min or more;

said polyethylene copolymer or ethylene plastomer or elastomer having a crosslinking degree measured as XHU of less than 0.50 wt %;

an Mw/Mn of 1.5 to 4;

and a compound of formula $R_1R_2R_3CH$ and/or $R_4R_5R_6CH$, wherein each of $R_1$, $R_3$, $R_4$ and $R_6$ independently is selected from the group consisting of hydrogen, substituted and unsubstituted straight, branched, and cyclic, hydrocarbons with 1 to 12 C-atoms and substituted and unsubstituted aromatic hydrocarbons with 6 to 12 C atoms, and each of $R_2$ and $R_5$ independently is selected from the group consisting of substituted and unsubstituted straight, branched, and cyclic hydrocarbons with 1 to 12 C-atoms and substituted and unsubstituted aromatic hydrocarbons with 6 to 12 C-atoms and wherein at least one of $R_1$, $R_2$, $R_3$, $R_4$, $R_5$ and $R_6$ is a substituted or unsubstituted aromatic hydrocarbon with 6 to 12 C-atoms.

Viewed from another aspect the invention provides a hot melt adhesive comprising A) 10 to 100 wt % of a visbroken polyethylene copolymer having a density of 910 to 970 kg/m³ and an $MFR_2$ of 200 g/10 min or more or a visbroken ethylene plastomer or elastomer having a density of 855 to 910 kg/m³ and an $MFR_2$ of 200 g/10 min or more;

said polyethylene copolymer or ethylene plastomer or elastomer having a crosslinking degree measured as XHU of less than 0.50 wt %; an Mw/Mn of 1.5 to 4; and (B) one or more tackifiers in an amount of 0 to 70 wt % and (C) one or more plasticizers in an amount of 0 to 60 wt % and/or (D) one or more waxes in an amount of 0 to 10 wt %.

DEFINITIONS

The term molecular weight is used herein to refer to weight average molecular weight Mw unless otherwise specified.

All MFR values are $MFR_2$ values unless otherwise stated.

The term maximum barrel temperature is regarded as the hottest temperature applied to any barrel of the extruder.

The term ethylene plastomer or elastomer having a density of 855 to 910 kg/m$^3$ means that the polymer in question is either an ethylene elastomer having a density of 855 to 880 kg/m$^3$ or is an ethylene plastomer having a density of 880 to 910 kg/m$^3$.

DETAILED DESCRIPTION OF INVENTION

This invention relates to a new process for the visbreaking of a polyethylene copolymer or an ethylene plastomer or elastomer. The process which preferably employs a single extrusion step leads to a remarkable increase in the MFR of the starting material polymer without any crosslinking.

Starting Material

The process of the invention uses a starting polyethylene which is a polyethylene copolymer having a density of 910 to 970 kg/m$^3$ or an ethylene plastomer or elastomer having a density of 855 to 910 kg/m$^3$. Ethylene elastomers have a density of 855 to 880 kg/m$^3$ and ethylene plastomers have a density of 880 to 910 kg/m$^3$.

The polyethylene copolymer is preferably a copolymer with one or more C3-20 alpha olefins. More preferably, the polyethylene copolymer is a copolymer of ethylene and 1-butene, 1-hexene or 1-octene.

Preferably the polyethylene copolymer is an LLDPE. Preferred LLDPEs have a density of 915 to 935 kg/m$^3$. Preferably ethylene based plastomers or elastomers have a density (ISO 1183) in the range of 860 to 900 kg/m$^3$ and more preferably in the range of 870 to 890 kg/m$^3$.

Preferred ethylene based plastomers therefore have a density (ISO 1183) in the range of 880 to 900 kg/m$^3$ and more preferably in the range of 880 to 890 kg/m$^3$. Preferred ethylene based elastomers have a density (ISO 1183) in the range of 860 to 880 kg/m$^3$ and more preferably in the range of 870 to 880 kg/m$^3$.

The MFR$_2$ of the starting material, either polyethylene copolymer or ethylene plastomer or elastomer is preferably between 1.0 and 100 g/10 min, such as 2.0 to 90 g/10 min. In some embodiments, the MFR$_2$ of the starting material is high, e.g. 50 to 100 g/10 min, preferably 60 to 90 g/10 min. It is however, also possible to use a starting material with an MFR$_2$ of 1.0 to 15 g/10 min, such as 1 to 10 g/10 min preferably 2.0 to 10 g/10 min.

The Mw/Mn value of the starting polymer is preferably in the range of 1.5 to 4.0 before extrusion.

The starting material can be unimodal or multimodal, preferably unimodal. The starting material, whether polyethylene copolymer, plastomer or elastomer, is an ethylene copolymer. By ethylene copolymer is meant a polymer the majority by weight of which derives from ethylene monomer units. The comonomer contribution preferably is up to 40 wt % depending on the nature of the starting material. The comonomer contents of conventional ethylene plastomers, ethylene elastomers and polyethylene copolymers, like LLDPEs are familiar to the person skilled in the art.

The polyethylene copolymer, e.g. LLDPE, elastomer or plastomer is therefore preferably an ethylene copolymer with one or more copolymerisable monomers. The copolymerisable monomer or monomers present are preferably C3-20, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methyl-pent-1-ene. The use of 1-hexene, 1-octene and 1-butene are particularly preferred. Ideally there is only one comonomer present. That comonomer is especially 1-octene.

It is preferred if the starting material is an ethylene plastomer or an ethylene elastomer as herein defined.

Preferably, the plastomer, elastomer or polyethylene copolymer is a metallocene catalyzed polymer although Ziegler-Natta based polyethylene copolymers, ethylene elastomers and ethylene plastomers are also possible.

It is preferred if the starting material is a plastomer or elastomer. Furthermore the ethylene based plastomers or elastomers preferably have a viscosity eta0.05 (measured according to ISO 6721-1 and 10 at 0.05 rad/s and at 177° C.) of from 100 Pa·s to 200 Pa·s, preferably from 110 Pa·s to 180 Pa·s and more preferably from 120 Pa·s to 150 Pa·s. The viscosity eta0.05 (measured according to ISO 6721-1 and 10 at 0.05 rad/s and at 149° C.) of such plastomers or elastomers is in the range of from 220 Pa·s to 300 Pa·s, preferably from 240 Pa·s to 290 Pa·s and more preferably from 250 Pa·s to 270 Pa·s.

The melting points (measured with DSC according to ISO 11357-1) of suitable ethylene based plastomers or elastomers are below 100° C., preferably below 90° C. and more preferably below 80° C. Suitable plastomers or elastomers of ethylene and a C4-C10 alpha olefin have an ethylene content from 60 to 95 wt %, preferably from 65 to 90 wt % and more preferably from 70 to 88 wt %.

The molecular mass distribution Mw/Mn of suitable ethylene based plastomers or elastomers is preferably in the range of 2.0 to 3.5, preferably in the range of 2.5 to 3.5.

These ethylene based plastomers or elastomers can be prepared by known processes, in a one stage or two stage polymerization process, comprising solution polymerization, slurry polymerization, gas phase polymerization or combinations therefrom, in the presence of suitable metallocene catalysts, known to the art skilled persons.

Preferably these ethylene based plastomers or elastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by C1-4 alkyl group such as pentane, methyl pentane, hexane, heptane, octane, cyclohexane, methylcyclohexane and hydrogenated naphtha. More preferably unsubstituted C6-10-hydrocarbon solvents are used. A known solution technology suitable for the process according to the invention is the COMPACT technology.

It is also possible to use a mixture of the ethylene plastomer/elastomer and an ethylene copolymer as starting materials. If such a blend is employed, preferably there is a minimum of 10 wt % of each component in the blend, such as a minimum of 20 wt % of each component.

It will be appreciated that the polymer starting material may contain standard polymer additives. However, if additives are added before visbreaking there could be an interaction between the additive and visbreaking agent. It thus preferred if additives are added at the end of the extrusion process before going to the die.

Extrusion Conditions

In order to increase the $MFR_2$ of the starting material, the process of the invention extrudes the polymer under particular conditions and using a specific radical initiator. The extrusion process is one preferably carried out using at least one of high temperature, high shear and high speed. Moreover, the increase in MFR desired can be achieved using a single extrusion step. Many prior art processes require complex multiple extrusions. We achieve a massive uplift in MFR using a single extrusion.

The extruder may thus be a single screw extruder, a twin screw extruder, such as a co-rotating twin screw extruder or a counter-rotating twin screw extruder; or a multi-screw extruder, such as a ring extruder. Suitable extruders include a single screw extruder or a twin screw extruder. Especially preferably the extruder is a co-rotating twin screw extruder.

Suitable extruders typically are from 125 to 2540 cm, preferably from 510 to 1270 cm, and more preferably from 635 to 1020 cm in length. The residence time for the polymeric feedstock in the extruder is typically from about 30 seconds to about 5 minutes, preferably from about 30 secs to about 3 minutes.

The extruder typically has a plurality of heating zones. It is to be noted that during the extrusion process, a substantial amount of heat is often generated from shear heating. Thus, the temperature of the polymeric melt in the extruder may be substantially higher than the temperature set in the heating zone(s) at the barrel of the screw, and may also be substantially higher than the actual zone temperature readings in the extruder. Further, the actual zone temperature readings in different stages of the extruder may also be higher than the temperatures set at the heating zones. The temperatures referred to herein are the temperatures set in the heating zones.

Such extruders are well known in the art and are supplied, for instance, by Coperion, Japan Steel Works, Krauss Maffei Berstorff or Leisteritz. A preferred extruder is a Coperion ZSK32 extruder line.

The extrusion is preferably a high temperature extrusion. By high temperature is meant that the highest barrel temperature is set at a minimum of 250° C., preferably a minimum of 300° C., such as at least 310° C., such as at least 325° C., especially at least 340° C. A temperature of 350° C. is ideal. The upper limit for the highest barrel temperature extruder may be 400° C.

Preferably, this translates to a melt temperature of the polymer melt exiting the die of at least of 240° C., preferably at least 290° C., such as at least 310° C., especially at least 320° C. A temperature of at least 330° C. is ideal, such as 340° C. or more. The upper limit for the melt temperature exiting the die may be 390° C.

In a preferred extruder of the invention there are 10 to 14 barrels such as 12 barrels. In a preferred embodiment, the high extrusion temperature is applied by barrel 3. It is preferred if the maximum extrusion temperature is applied by barrel 3 and is maintained across the remaining barrels in the extruder.

The temperature of the die plate may be 120° C. to 180° C.

In a preferred embodiment, the temperature profile is preferably set as the following: barrel 1 at less than 80° C., barrel 2 at 80 to 120° C., barrel 3 to 12 at 250° C. or more.

In a preferred embodiment, the temperature profile is preferably set as the following: barrel 1 at 20° C., barrel 2 at 100° C., barrel 3 to 12 at 350° C. and die-plate at 150° C.

Without wishing to be limited by theory, we perceive that higher temperatures lead to an increase in MFR and hence a decrease in Mw.

It is also preferred if the extruder is operated at high screw speed. By high screw speed is meant that the extruder screw turns at a speed of at least 300 rpm, such as at least 350 rpm, especially at least 400 rpm. Screw speeds much higher can also be employed such as 600 rpm or more, 800 rpm or more, or 1000 rpm or more. The upper limit for the screw speed is governed by the extruder in use but may be 1300 rpm. The range of 450 to 1200 rpm is preferred. It is preferred if the screw speed remains constant throughout the process.

Without wishing to be limited by theory, we perceive that higher screw speeds lead to an increase in MFR and hence a decrease in Mw.

The throughput is also linked to the MFR increase. The higher the throughput the lower the MFR increase as there is less opportunity for the polymer to be subjected to the visbreaking conditions within the extruder. Whilst therefore high screw speeds are preferred, it is also preferred if throughput values are kept low.

A suitable throughput on an industrial extruder might be 5 to 40 kg/h, such as 10 to 20 kg/h. Lower throughput leads to higher MFR.

The screw speed is also linked to residence time within the extruder. Faster screw speeds mean shorter residence times. Preferred residence times for the process of the invention within the extruder are 30 s to 1.5 minutes, such as 35 secs to 70 secs.

In this regard, the inventors consider the specific energy input to the process to be an important consideration. The specific energy input (SEI) is the amount of power that is supplied to the extruder motor per kg of polymer material. Higher screw speeds mean more power to the motor. Higher output requires more power to the motor. A high SEI is key to achieving a high final MFR as can be seen in FIG. 3. The correlation between SEI and MFR is essentially linear.

The energy input to the extruder motor can be measured from the extruder itself. It is a derivable output from the extruder. It will be appreciated that the SEI value is dependent on the size and nature of the extruder used. Values in the text are measured using Coperion ZSK32.

Thus SEI is preferably at least 0.2 kWh/kg, preferably at least 0.4 kWh/kg.

The process of the invention also preferably uses high shear. The high shear effect preferably comes from one or more kneader 90° screw elements which can be positioned in the mixing zone of the extruder. The extruder screw elements and screw configuration are designed to promote strong shearing effect with optimized melt mixing.

The polymer melt exiting the extruder die could be collected in a closed container and kept in liquid state for transporting to the customer and use. Preferably however, the polymer melt exiting the extruder die can be pelletized using conventional pelletisation techniques. It is a further aspect of the invention therefore that the polymer exiting the extruder is pelletised.

Extruder

As is clear, the nature of the extruder is important. In more detail, the extruder typically comprises a feed zone, a melting zone, a mixing zone and a die zone. Further, the melt pressed through the die is typically solidified and cut to pellets in a pelletiser. The extruder typically has a length over diameter ratio, L/D, of from about 6:1 to about 65:1, preferably from about 8:1 to 60:1. As it is well known in the art the co-rotating twin screw extruders usually have a greater L/D than the counter-rotating twin screw extruders. The extruder may have one or more evacuation, or vent, ports for removing gaseous components from the extruder.

Such evacuation ports should be placed in a sufficient downstream location for allowing sufficient reaction time for the initiator with the polymer. Suitably the evacuation port can be located within the downstream end of the melting zone or within the mixing zone.

A stripping agent, such as water, steam or nitrogen, is suitably added to the extruder to assist in removing the volatile components from the polymer melt. Such stripping agent, when used, is added upstream of the evacuation port or upstream of the most downstream evacuation port, if there are multiple evacuation ports.

The extruder may also have one or more feed ports for feeding further components, such as polymer, additives and the like, into the extruder. The location of such additional feed ports depends on the type of material added through the port.

Feed Zone

The polymer is introduced into the extruder through a feed zone. The feed zone directs the particulate polymer into the melting zone. Typically the feed zone is formed of a feed hopper and a connection pipe connecting the hopper into the melting zone. Usually the polymer flows through the feed zone under the action of gravity, i.e., generally downwards. The residence time of the polymer (and other components) in the feed zone is typically short, normally not more than 30 seconds, more often not more than 20 seconds, such as not more than 10 seconds.

Typically the residence time is at least 0.1 seconds, such as one second. If the mixer is not present in the process then the feed zone of the extruder may serve as the location where the mixed fluid stream and the stream of particles of the polymer are contacted. If the feed zone of the extruder serves for contacting the streams then the particles of the olefin polymer and the mixed fluid stream are preferably introduced into the feed hopper.

Melting Zone

The mixed particulate stream passes from the feed zone to a melting zone. In the melting zone the particulate polymer melts. The solid polymer particles are conveyed by drag caused by the rotating screw. The temperature then increases along the length of the screw through dissipation of frictional heat and increases to a level above the melting temperature of the polymer. Thereby the solid particles start to melt.

It is preferred that the screw in the melting zone is designed so that the screw in the melting zone is completely filled. Thereby the solid particles form a compact bed in the melting zone. This happens when there is sufficient pressure generation in the screw channel and the screw channel is fully filled. Typically the screw in the melting zone comprises conveying elements without substantial backwards flow. However, in order to achieve compact bed some barrier or back-mixing elements may need to be installed at a suitable location, for instance, close to the downstream end of the melting zone. The screw design for obtaining a compact particle bed is well known in the extruder industry. The problem is discussed, among others, in paragraphs 15 7.2.2 and 8.6.2 of Chris Rauwendaal: "Polymer Extrusion", Carl Hanser Verlag, Munich 1986.

Due to frictional heat the temperature increases along the length of the screw and the polymer starts to melt. The melting behaviour is discussed, for instance, in the above-mentioned book of Chris Rauwendaal, in the paragraph 7.3, especially in 7.3.1.1, and 7.3.2.

Mixing Zone

After the melting zone the polymer passes to a mixing zone. The screw in the mixing zone typically comprises one or more mixing sections which comprise screw elements providing a certain degree of backward flow. In the mixing zone the polymer melt is mixed for achieving a homogeneous mixture. The mixing zone may also comprise additional elements, such as a throttle valve or a gear pump.

The temperature in the mixing zone is greater than the melting temperature of the polymer. Further, the temperature needs to be greater than the decomposition temperature of the radical generator. The temperature needs to be less than the decomposition temperature of the polymer.

The overall average residence time in the combined melting zone and the mixing zone of the extruder should be preferably at least about 25 seconds and more preferably at least about 30 seconds. Typically the average residence time does not exceed 60 seconds and preferably it does not exceed 55 seconds. Good results have been obtained when the average residence time was within the range of from 30 to 45 seconds.

As it was discussed above, it is preferred to remove gaseous material from the extruder via one or more evacuation ports or, as they are sometimes called, vent ports. Venting of gaseous material from the extruder is well known in the industry and is discussed, for instance, in the above-mentioned book of Chris Rauwendaal, in paragraphs 8.5.2 and 8.5.3.

It is possible to use more than one evacuation port. For instance, there may be two ports, an upstream port for crude degassing and a downstream port for removing the remaining volatile material. Such an arrangement is advantageous if there is large amount of gaseous material in the extruder.

The vent ports are suitably located in the mixing zone. However, they may also be located at the downstream end of the melting zone. Especially if there are multiple vent ports it is sometimes advantageous to have the most upstream port within the melting zone and the subsequent port(s) in the mixing zone. It is also possible to add a stripping agent, such as water, steam, $CO_2$ or $N_2$, into the extruder.

Such stripping agent, when used, is introduced upstream of the vent port or, when there are multiple vent ports, upstream of the most downstream vent port and downstream of the upstream vent port. Typically the stripping agent is introduced into the mixing zone or at the downstream end of the melting zone. Stripping is discussed, among others, in paragraph 8.5.2.4 of the book of Chris Rauwendaal, temperature should be preferably at least 165° C., more preferably at least 170° C.

The die zone typically comprises a die plate, which is sometimes also called breaker plate and which is a thick metal disk having multiple holes. The holes are parallel to the screw axis. The molten olefin polymer is pressed through the die plate. The molten polymer thus forms a multitude of strands. The strands are then passed to the pelletiser.

The function of the die plate is to arrest the spiralling motion of the polymer melt and force it to flow in one direction.

The die zone may also comprise one or more screens which are typically supported by the die plate. The screens are used for removing foreign material from the polymer melt and also for removing gels from the polymer. The gels are typically undispersed high molecular weight polymer, for instance, cross-linked polymer.

Radical Initiator

The radical initiator used in the process of the invention is preferably one that decomposes at high temperature, i.e. at least 200° C. This means that the Self-Accelerating Decomposition Temperature (SADT) of the initiator of the invention is preferably at least 200° C. The initiator will therefore be stable up until this temperature. The initiator generally will not start degrading therefore until the polymer melt has passed through the extruder, perhaps to barrel 3.

If an initiator is used which decomposes at a lower temperature, the initiator decomposes too early or too rapidly in the process and the increase in MFR which we require is not achieved. For example, peroxides loose activity very quickly making them unsuitable for use in the process of this invention. Alternatively, viewed, the initiator is not a peroxide. Peroxide initiators generally decompose at too low a temperature to be useful in this invention.

The radical initiator is present in the process of the invention in an amount of 0.1 to 2.0 wt % based on the amount of the starting material polymer that is present, preferably 0.2 to 1.5 wt %, especially 0.4 to 1.0 wt %. Thus, if you use 100 g of starting material polymer, there can be 0.1 to 2.0 g of the radical initiator. The amount of radical initiator above is the total amount added. It will be appreciated that the radical initiator can be added in one batch or in separate batches in different parts of the extruder.

In one embodiment however, all the initiator is added at the start of the process. By start of the process is meant that the radical initiator is added with the starting material polymer to the first barrel of the extruder.

It is preferred if a portion of the radical initiator is added at the start of the extrusion process and a portion of the radical initiator is added later in the process. In this embodiment, it is preferred if the amount added at the start of the process represents 30 to 70 wt % of the total radical initiator added, such as 40 to 60 wt %, such as about 50 wt % of the radical initiator added. It is preferred if the amount added after the start of the process represents 30 to 70 wt % of the total radical initiator added, such as 40 to 60 wt %, such as about 50 wt % of the radical initiator added.

Radical initiator added later in the process can be added to any later barrel in the extrusion process, such as the $4^{th}$, $5^{th}$, $6^{th}$ or $7^{th}$ barrel, especially the $6^{th}$ barrel. In a preferred set up there are 12 barrels.

The starting material polymer is dosed in the main hopper of the extruder. The radical initiator is preferably either dosed at once to the first barrel of the extruder or at both first and sixth barrels at the same time based on half-split of its amount.

The amount of initiator added can be used to control the MFR of the final polymer. Higher amounts of initiator tend to lead to higher MFR values.

The radical initiator used in the invention is preferably not a peroxide. Preferably the initiator is at least one compound (C) being capable of thermally decomposing into carbon-based free radicals by breaking at least one single bond, like a carbon-carbon single bond or a carbon-hydrogen bond. The carbon-based free radicals preferably have the formula (I) or (II)

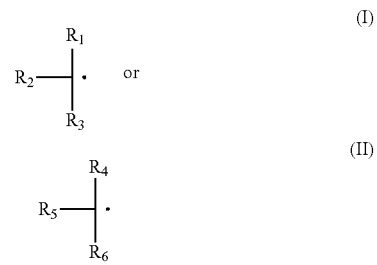

In formula (I) each of $R_1$, $R_2$ and $R_3$ can be independently selected from hydrogen, substituted or unsubstituted straight chain, branched or cyclic saturated or mono-unsaturated hydrocarbons with 1 to 12 C-atoms, substituted or unsubstituted aromatic hydrocarbons with 6 to 12 C-atoms or carboxylate groups COOX, with X being a C1-C6-alkyl group, whereby at least one of $R_1$, $R_2$ and $R_3$ is a substituted or unsubstituted aromatic hydrocarbon with 6 to 12 C-atoms.

In formula (II), $R_4$ and $R_6$ independently are selected from the group consisting of hydrogen, substituted and unsubstituted straight, branched, and cyclic, hydrocarbons with 1 to 12 C-atoms and substituted and unsubstituted aromatic hydrocarbons with 6 to 12 C atoms, and $R_5$ is selected from the group consisting of substituted and unsubstituted straight, branched, and cyclic hydrocarbons with 1 to 12 C-atoms and substituted and unsubstituted aromatic hydrocarbons with 6 to 12 C-atoms and wherein at least one of $R_4$, $R_5$ and $R_6$ is a substituted or unsubstituted aromatic hydrocarbon with 6 to 12 C-atoms.

Suitable carbon-based free radicals of formula (I) or (II) are known for example from Chemicals Reviews, 2014, 114, p 5013, FIG. 1, radicals R1 to R61. Preferably each of $R_1$, and $R_3$ can be independently selected from the group consisting of hydrogen, substituted and unsubstituted straight, branched and cyclic hydrocarbons with 1 to 12 C-atoms and substituted and unsubstituted aromatic hydrocarbons with 6 to 12 C-atoms, and $R_2$ can be selected from the group consisting of substituted and unsubstituted straight, branched and cyclic hydrocarbons with 1 to 12 C-atoms and substituted and unsubstituted aromatic hydrocarbons with 6 to 12 C-atoms.

As stated above at least one of the groups $R_1$, $R_2$ and $R_3$ or $R_4$, $R_5$ and $R_6$ is a substituted or unsubstituted aromatic hydrocarbons with 6 to 12 C-atoms. The carbon-based free radicals of formula (I) or formula (II) being suitable in the present invention are thus preferably generated from one or more compounds (C) of the formula (III)

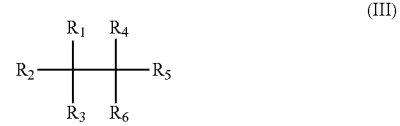

wherein each of $R_1$, $R_3$, $R_4$ and $R_6$ independently is selected from the group consisting of hydrogen, substituted and unsubstituted straight, branched, and cyclic, hydrocarbons with 1 to 12 C-atoms and substituted and unsubstituted aromatic hydrocarbons with 6 to 12 C atoms, and each of $R_2$ and $R_5$ independently is selected from the group consisting of substituted and unsubstituted straight, branched, and cyclic hydrocarbons with 1 to 12 C-atoms and substituted and unsubstituted aromatic hydrocarbons with 6 to 12 C-atoms and wherein at least one of $R_1$, $R_2$, $R_3$, $R_4$, $R_5$ and $R_6$ is a substituted or unsubstituted aromatic hydrocarbon with 6 to 12 C-atoms.

The compound (C) of formula (III) can have a symmetrical as well as an asymmetrical structure. More preferably each of $R_2$ and $R_5$ independently is selected from a substituted or unsubstituted aromatic hydrocarbon with 6 to 12 C-atoms and yet more preferably from the group consisting of substituted and unsubstituted aryl groups with 6 to 10 C-atoms and each of $R_1$, $R_3$, $R_4$ and $R_6$ independently is selected from the group consisting of hydrogen and C1-C6 alkyl groups.

Even more preferred the compounds (C) have the formula (IV)

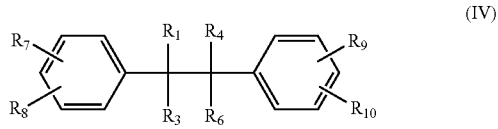

wherein each of $R_7$, $R_8$, $R_9$ and $R_{10}$ independently is selected from a group consisting of hydrogen atom, C1-6 alkyl groups, C1-2 alkoxy groups, a nitrile group and a halogen atom, and wherein each of $R_1$, $R_3$, $R_4$ and $R_6$ independently is selected from group consisting of hydrogen and C1-6 alkyl groups.

In a still more preferred embodiment said compound (C) is selected from the group consisting of 2,3-dimethyl-2,3-diphenylbutane, 2,3-dipropyl-2,3-diphenylbutane, 2,3-dibutyl-2,3-diphenylbutane, 2,3-dihexyl-2,3-diphenylbutane, 2-methyl-3-ethyl-2,3-diphenylbutane, 2-methyl-2,3-diphenylbutane, 2,3-diphenylbutane, 2,3-dimethyl-2,3-di-(pmethoxyphenyl)-butane, 2,3-dimethyl-2,3-di-(pmethylphenyl)-butane, 2,3-dimethyl-2-methylphenyl-3-(p 2'3'-dimethyl-3'-methylphenyl-butyl)-phenyl-butane, 3,4-dimethyl-3,4-diphenylhexane, 3,4-diethyl-3,4-diphenylhexane, 3,4-dipropyl-3,4-diphenylhexane, 4,5-dipropyl-4,5-diphenyloctane, 2,3-diisobutyl-2,3-diphenylbutane, 3,4-diisobutyl-3,4-5 diphenylhexane, 2,3-dimethyl-2,3-di p(tbutyl)-phenyl-butane, 5,6-dimethyl-5,6diphenyldecane, 6,7-dimethyl-6,7-diphenyldodecane, 7,8-dimethyl-7,8-di(methoxyphenyl)-tetra-decane, 2,3-diethyl-2,3-diphenylbutane, 2,3-dimethyl-2,3-di(p-chlorophenyl) butane, 2,3-dimethyl-2,3-di(p-iodophenyl)butane, and 2,3-dimethyl-2,3-di(p-nitrophenyl) butane.

Most preferably compound (C) is selected from the group consisting of 2,3-dimethyl-2,3-diphenylbutane and 3,4-dimethyl-3,4-diphenylhexane.

Final Post Extrusion Polymer

The polymer material which exits the extruder is considerably higher in MFR and lower in Mw than the starting material. The final polymer will have an $MFR_2$ of at least 200 g/10 min. The increase in $MFR_2$ is preferably at least 3 fold (i.e. 3×higher than the starting material). In a preferred embodiment therefore:

$MFR_2$ final>3×$MFR_2$start

More preferably $MFR_2$ final>4×$MFR_2$start; more preferably
$MFR_2$ final>4.5×$MFR_2$start; or even
$MFR_2$ final>5×$MFR_2$start Where the starting material $MFR_2$ is low, e.g. less than 10 g/10 min the increase in $MFR_2$ can be even more remarkable. In embodiments of the invention therefore, the increase in $MFR_2$ may be 10 fold or more, such as 20 fold or more. The increases in MFR reported in the examples for low MFR plastomers or elastomers are spectacular.

Alternatively viewed, the MFR increase achieved using the process of the invention is preferably at least 150 g/10 min, such as at least 200 g/10 min, more preferably at least 250 g/10 min, especially at least 300 g/10 min. In some embodiments, we can increase the $MFR_2$ by 400 g/10 min or more.

Preferred final $MFR_2$ values, irrespective of the starting material polymer, are 300 g/10 min or more, such as 350 g/10 min or more, especially 400 g/10 min or more, more especially 450 g/10 min or more, such as 500 g/10 min or more. Values of 600 g/10 min or more are also possible. It is especially preferred if the final $MFR_2$ is between 500 and 1300 g/10 min, It is also important that the final polymer material does not exhibit crosslinking. The crosslinking degree of the final polymer is preferably less than 0.5 wt % (determined as XHU as explained in the examples), such as less than 0.4 wt %, preferably less than 0.3 wt %. In some embodiments crosslinking can be 0.1 wt % or less, such as 0.05 wt % or less.

The density of the final polymer (also known as the visbroken polymer) remains essentially unchanged. The final polymer is preferably a LLDPE having a density of 910 to 940 kg/m$^3$, preferably 915 to 935 kg/m$^3$ or an ethylene plastomer or elastomer having a density of 855 to 910 kg/m$^3$. Preferably ethylene based plastomers or elastomers have a density (ISO 1183) in the range of 860 to 900 kg/m$^3$ and more preferably in the range of 870 to 890 kg/m$^3$ after extrusion.

It is also remarkable that the Mw/Mn value of the polymer appears not to change. Thus the Mw/Mn is preferably in the range of 1.5 to 4.0 after extrusion. The pre-extrusion values listed above therefor apply to the post extrusion polymer as well.

The melting points (measured with DSC according to ISO 11357-1) of visbroken plastomers or elastomers are below 100° C., preferably below 90° C. and more preferably below 85° C. A preferred melting point for the ethylene copolymer, such as an LLDPE, is 120° C. or less.

As the final polymer of the invention derives from a visbreaking process as opposed to directly from the polymerisation process, the polymer is likely to contain residues deriving from the initiator. For example, when the initiator is one of formula (III) above,

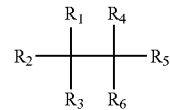

the radical is generated via fission of the C—C bond leaving radical groups $R_1R_2R_3C^•$ and $R_4R_5R_6C^•$. As these radicals acquire a proton the resulting compound may be detected as impurity in the final polymer. Detection methods include NMR. Detection of this compound confirms that the polymer derives from visbreaking as opposed to direct synthesis.

The radical $R_1R_2R_3C^•$ or $R_4R_5R_6C^•$ may also attach to the polymer chain.

The final polymer can also be readily recycled.

Furthermore the visbroken ethylene plastomers or elastomers preferably have a viscosity eta0.05 (measured according to ISO 6721-1 and 10 at 0.05 rad/s and at 190° C.) of from 10 Pa·s to 40 Pa·s, preferably from 11 Pa·s to 35 Pa·s and more preferably from 12 Pa·s to 32 Pa·s.

The visbroken polymer of the invention general presents in a white shade colour without the need to add colour reducing agents. There is no yellowness at all. The absence of yellowness implies that the visbroken polymer has resisted any degradation. Yellowness is often caused by the generation of carbonyl groups and the absence of this colour shows no degradation in the polymer.

The final polymer can have further additives added to it if desired, however normally this is not required. Minor quantities of additives such as pigments, nucleating agents, antistatic agents, fillers, antioxidants, etc. may however be present.

Applications

It is particularly preferred if the final polymer of the invention is employed in hot melt adhesive compositions. Viewed from another aspect therefore the invention provides a hot melt adhesive composition comprising:

a visbroken polyethylene copolymer having a density of 910 to 970 kg/m³ and an $MFR_2$ of 200 g/10 min or more or a visbroken ethylene plastomer or elastomer having a density of 855 to 910 kg/m³ and an $MFR_2$ of 200 g/10 min or more (A); and optionally one or more tackifiers (B);
one or more plasticizers (C); and/or
one or more waxes (D).

Polymer (A) is preferably an ethylene plastomer or elastomer.

The visbroken plastomer or elastomer (A) can be the only component of the hot melt adhesive therefore or the composition can comprise all of tackifiers (B), plasticizers (C) and waxes (D).

The visbroken ethylene plastomer or elastomer (A) can therefore for 10 to 100 wt % of the HMA.

The tackifier (B) is preferably selected in the group consisting of aliphatic, alicyclic and aromatic resin, and modified material and hydrogenated derivatives thereof, rosin and modified materials and derivatives of rosin, terpenes and modified materials and derivatives of terpenes. The tackifier can be one of the above resins, or can be a combination of more than one of the above resins.

Thus, as used herein, the term "tackifier" includes:

(a) aliphatic and cycloaliphatic petroleum hydrocarbon resins having Ring and Ball softening points of from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Hercules Corp. and Escoreze 1310LC solid by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) natural and modified rosin such as, for example, gun rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) phenolic-modified terpene resins such as, for example, the resin product resulting from the condensation in an acidic medium of a terpene and a phenol.

Mixtures of two or more of the above described tackifiers may be required for some formulations.

Preferably, the tackifiers can be selected from any of the nonpolar types, which are commercially available. e.g. Eastotac from Eastman Chemical Co., Escorez from Exxon Chemical Co., Wingtack from Goodyear Chemical Co., Hercolite from Hercules Inc., Zonatac from Arizona Chemical Co. Preferred resins are aliphatic petroleum hydrocarbon resins examples of which are based on C5 olefins such as Hercotac 1148 available from Hercules Corp. Most preferred are nonpolar products which are hydrogenated dicyclo-penta-diene (DCPD) based or aromatically modified derivatives thereof with softening points above 70° C.

Examples of such resins are Escoreze 5400 and Escoreze 5600 sold by ExxonMobil Chemical company.

If one or more tackifiers are present as component B in the hot melt adhesive composition of the present invention the amount of component B is in the range of 10 to 70 wt % (based on the total weight of the composition), preferably in the range of 15 to 60 wt %.

The hot melt adhesive composition of the present invention can optionally further comprise plasticizer(s) (C) and/or a wax component(s) (D).

The plasticizer(s) which can be utilized in the hot melt adhesive of the present invention provide viscosity control and wetting and specific adhesion to bonded substrates. These plasticizers are selected from a group comprising paraffin oils, chlorinated paraffines, phthalates and adipate esters, oligomers of polypropylene, polybutenes, polyisoprene, hydrogenated polyisoprene and polybutadiene, benzoate esters (e.g. 1,4-cyclohexane dimethanol dibenzoate, glyceryl tribenzoate or pentaerythriol tetrabenzoate), and vegetable and animal oils and derivatives thereof and mixtures of two or more of any of the foregoing.

The preferred primary plasticizer is a benzoate or paraffinic oil, a commercial grade of paraffinic oil widely used is available from Witco under the tradename Kaydol oil.

Plasticizers can broadly represent from about 0 to about 60 wt % of the hot melt adhesive of this invention and preferably represent from about 15 to about 25 parts by weight of the hot melt adhesive of this invention.

Wax component(s) can also be optionally utilized in the present invention. Wax components are useful for multipurpose hot melt adhesives, in that these components offer additional wetting and added creep resistance for foamed elastic attachments. These wax additives can be selected from a group comprised of paraffin wax, microcrystalline wax, Fischer-Tropsch wax, fatty amide waxes, polyethylene wax, ethylene vinyl acetate wax, oxidized polyethylene wax, hydrogenated castor oil and derivatives thereof, polypropylene wax and mixtures of two or more of any of the foregoing. The preferred waxes for the present invention are selected from a group of oxidized polyethylene waxes, of which a commercial grade is available from Allied Signal under the tradename AC-395. Wax component(s) can represent from 0 to about 10 wt % of the hot melt adhesive of this invention and preferably represent from about 3 to about 7 wt % of the hot melt adhesive of this invention.

Thus the hot melt adhesive may be composed of (A) at least visbroken plastomers or elastomers as defined above in an amount of 10 to 80 wt %; and (B) one or more tackifiers in an amount of 10 to 70 wt % and (C) one or more plasticizers in an amount of 0 to 60 wt % and/or (D) one or more waxes, in an amount of 0 to 10 wt %.

If necessary, the hot melt adhesive composition according to the present invention may further contain various additives. Examples of the various additives include a stabilizer and fine particle filler.

The "stabilizer" is blended so as to improve stability of the hot melt adhesive by preventing decrease in molecular weight, gelation, coloration, and generation of odour of the hot melt adhesive due to heat, and there is no particular limitation on the stabilizer as long as the objective hot melt adhesive of the present invention can be obtained. Examples of the "stabilizer" include an antioxidant and an ultraviolet absorber.

The "ultraviolet absorber" is used so as to improve light resistance of the hot melt adhesive.

The "antioxidant" is used so as to prevent oxidation degradation of the hot melt adhesive.

The antioxidant and ultraviolet absorber are commonly used in disposable products and can be used without particular limitation as long as the below-mentioned objective disposable products can be obtained.

Examples of the antioxidant include a phenol-based antioxidant, a sulphur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. These stabilizers can be used alone, or in combination.

The hot melt adhesive for disposable products of the present invention can further include fine particle filler. Commonly used fine particle filler may be used, and there is no particular limitation as long as the objective hot melt adhesive of the present invention can be obtained.

Examples, of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size (diameter in case of a spherical shape).

The hot melt adhesive composition of the present invention can be produced by blending the component (A) with optional component (B), blending optionally the components (C) and/or the component (D), if necessary adding the various additives, and melting the mixture with heating, followed by mixing. Specifically, the hot melt adhesive can be produced by charging the above components in a melt-mixing vessel equipped with a stirrer, followed by heating and mixing.

The hot melt adhesive composition of the present invention has many advantageous properties such as:

High MFR meaning high flow for a good wettability and therefore provide higher adhesion strength at low energy substrates Broad temperature applicability No gel formation No colour formation No acid release during the application process Good adhesion to substrates at extreme low temperature The hot melt adhesive composition of the present invention may be applied to a desired substrate by any method known in the art, and include, without limitation roll coating, painting, dry-brushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing.

The hot melt adhesive composition of the invention are useful as construction adhesives, core adhesives or elastic adhesives, and are particularly suitable for being used for packaging applications and disposables.

Examples of disposables are diapers, adult incontinent products, bed pads, a sanitary napkin, a pet sheet, a hospital gown, surgical capes, drapes or white garment and the like.

Packaging applications are for example like liquid packaging for milk, juice, wine or other liquids, flexible packaging for food like meat and cheese and medical products, rigid packaging like detergent cartons, cup and plate boards for oven or microwave use or sterilizable food packaging, but also for photographic paper or industrial applications like paper reel and ream wraps.

In addition the hot melt adhesive composition of the invention can be used in the field of bookbinding, furniture, footwear and transportation.

The polymers of the invention may also have utility in spunbond or melt blown, preferably in melt blown applications. For example, the polymers may be used in melt-blown webs. Non-woven structures may consist of melt-blown fibres, typically made in a one-step process in which high-velocity air blows a molten thermoplastic resin from an extruder die tip onto a conveyor belt or take-up screen to form a fine fibered self-bonding web.

Processes and apparatuses employed for producing melt-blown fibers and the resulting nonwoven webs are well known in the art. Melt-blowing technology can be used for producing light fiber webs directly from polymers of the invention. Melt-blown fibers are fibers formed by extruding a molten polymeric material through a plurality of fine, usually circular, die capillaries as molten threads or filaments into converging, usually hot and high velocity, gas (e.g. air) streams to attenuate the filaments of molten material and form fibers. During the melt blowing process, the diameters of the molten filaments are reduced by the drawing air to a desired size. Thereafter, the melt-blown fibers are carried by the high velocity gas stream and are deposited on a collecting surface (conveying belt or take-up screen) to form a web of randomly disbursed melt-blown fibers.

In the process metering pumps are used to pump the molten polymeric material to the distribution system, i.e. the die capillaries. The principal advantage of the melt-blown process is that one can make very fine fibers and very lightweight melt-blown webs with excellent uniformity. The result is a soft melt-blown web with excellent barrier properties, meaning effective filtration characteristics and resistance to penetration by aqueous liquids. In other words the process features "meltblown" distinguishes such produced fibers from fibers produced by different technology. More precisely "melt-blown fibers" are very thin having diameters not accomplished with other fiber processes. Furthermore, webs made out of such melt-blown fibers are softer and have lower weight compared to webs of the same thickness but produced by other technologies, like the spunbond process.

Accordingly, the melt-blown fiber according to the present invention preferably has an average diameter measured with scanning electron microscopy (SEM) of not more than 50 µm, like below 40 µm, more preferably of not more than 35 µm.

The polymers described herein also have utility in other fields however, such as carriers for masterbatches, lubricants, e.g. in an extrusion process.

In a further preferred embodiment, a visbroken plastomer or elastomer of the invention can be combined with a visbroken non-plastomer or elastomer material such as a visbroken LLDPE. This composition can bring significant advantageous and interesting properties, especially for the above-mentioned applications. The visbroken plastomer or elastomer component possesses low melting temperature, low molecular weight and good adhesive strength while the visbroken non-plastomer or elastomer material possesses, e.g. good cohesive strength and miscibility, etc.

The invention will now be described with reference to the following non limiting examples and figures.

FIG. 1 shows molecular weight distribution (by GPC) of the Ex 1 material (d 882 and MFR2 85) before and after visbreaking; also in comparison with "in-reactor" Dow material Affinity GA1900 (MFR2~1000):

| Material | Mw/Mn (GPC) |
| --- | --- |
| IE6 (MFR ~635.6) | 2.65 |
| Ethylene Octene Plastomer (MFR ~85) | 2.60 |
| Dow Affinity GA1900 (MFR~1000) | 2.04 |

Figure 1:
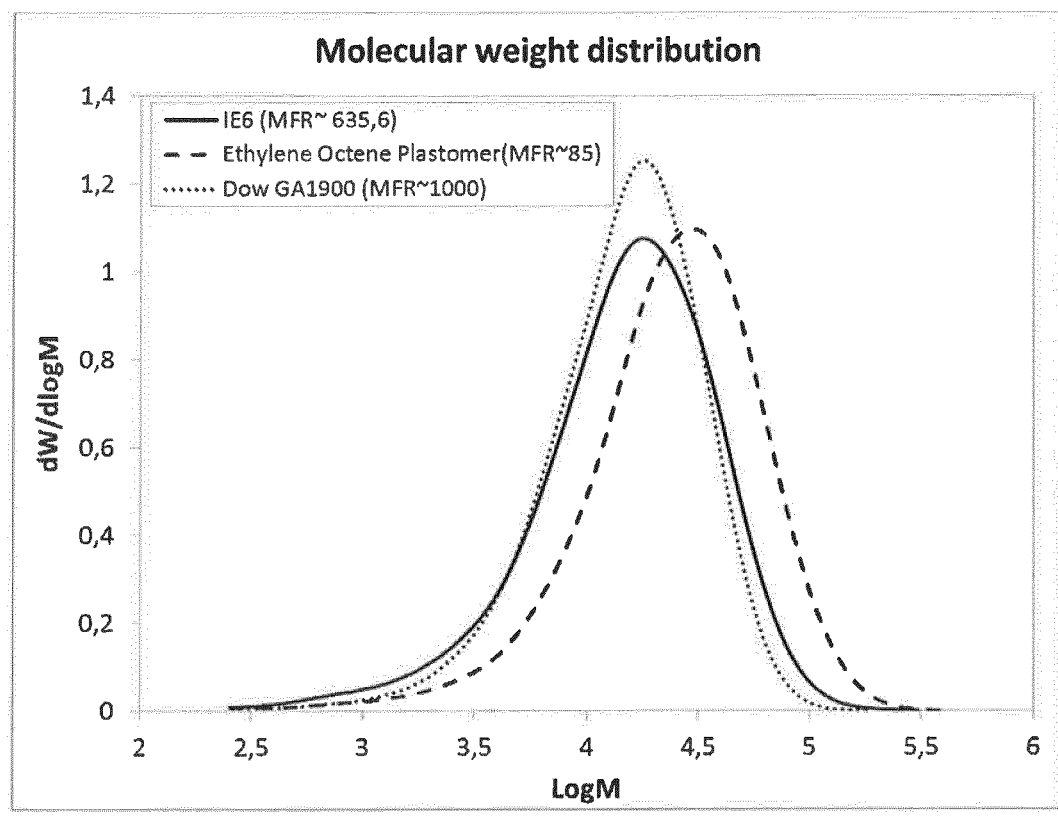
Figure 2:
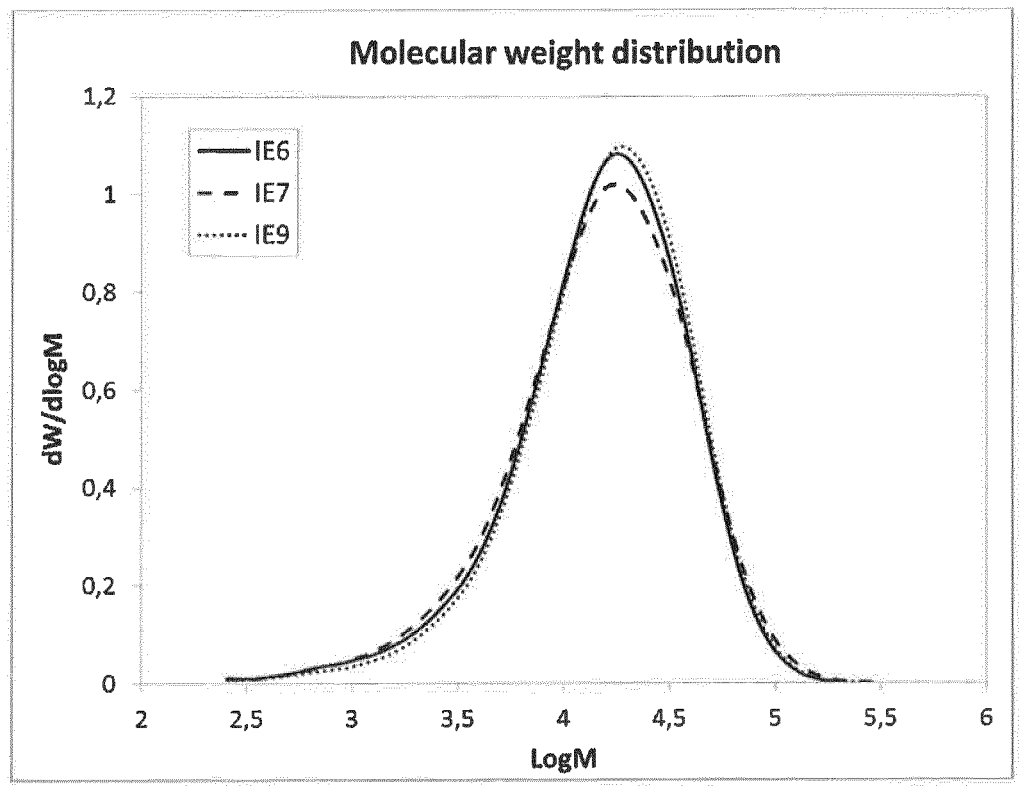
FIG. 2 shows the molecular weight distribution (by GPC) of the Ex 2 material (d 870 and MFR2 7) before and after visbreaking showing quite similar properties to that of Ex 1 (d 882 and MFR2 85).
Figure 3:
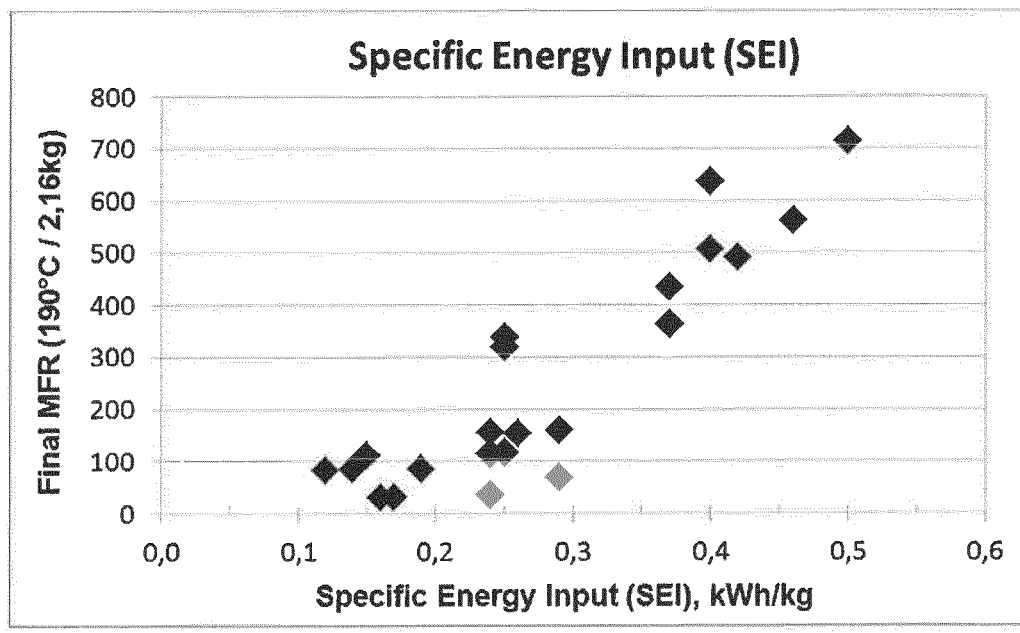
FIG. 3 shows the relationship between MFR and SEI. It is clear that as SEI increases, MFR increases.

TEST METHODS $MFR_2$ (190° C.) is measured according to ISO 1133 (190° C., 2.16 kg load).
Density is measured according to ISO 1183.
Melting Temperature Tm The melting temperature Tm, was measured with a TA Instruments Q2000 differential scanning calorimetry device (DSC) according to ISO 11357/3 on 5 to 10 mg samples. Melting temperatures were obtained in a heat/cool/heat cycle with a scan rate of 10° C./min between 30° C. and 180° C. Melting and crystallisation temperatures were taken as the peaks of the endotherms and exotherms in the cooling cycle and the second heating cycle respectively.

Number average molecular weight (Mn), weight average molecular weight (Mw) and polydispersity (Mw/Mn) are determined by Gel Permeation Chromatography (GPC) according to the following method:
The Weight Average Molecular Weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Comonomer content in polyethylene was measured in a known manner based on Fourier transform infrared spectroscopy (FTIR) calibrated with 13C-NMR, using Nicolet Magna 550 IR spectrometer together with Nicolet Omnic FTIR software. Films having a thickness of about 250 µm were compression molded from the samples. Similar films were made from calibration samples having a known content of the comonomer. The comonomer content was determined from the spectrum from the wave number range of from 1430 to 1100 cm-1. The absorbance is measured as the height of the peak by selecting the so-called short or long base line or both. The short base line is drawn in about 1410-1320 cm-1 through the minimum points and the long base line about between 1410 and 1220 cm-1. Calibrations need to be done specifically for each base line type. Also, the comonomer content of the unknown sample needs to be within the range of the comonomer contents of the calibration samples.

Viscosity Eta0.05

The characterization of polymer melts by dynamic shear measurements complies with ISO standards 6721-1 and 6721-10. The measurements were performed on an Anton Paar 10 MCR501 stress controlled rotational rheometer, using cone-plate geometry (diameter 25 mm, angular of 1° of the cone). Measurements were undertaken on compression molded plates, using nitrogen atmosphere and setting a strain within the linear viscoelastic regime. The oscillatory shear tests were done at a temperature of 190° C. applying a frequency of 0.05 rad/s and setting a gap of 1.3 mm. The values of viscosity ($\eta^*$) were obtained as a function of frequency (ω). Thereby, e.g. η*0.05 rad/s (eta0.05) is used as abbreviation for the viscosity at the frequency of 0.05 rad/s. The values are determined by means of a single point interpolation procedure, as defined by Rheoplus software, the option from Rheoplus "-Interpolate y-values to x-values from parameter" and the "logarithmic interpolation type" was applied.

XHU

About 0.5 g of the polymer (mp) are weighed and put in a mesh of metal (mm) which is weighed (mp+mm). The polymer in the mesh is extracted in a soxhlet apparatus with boiling xylene for 5 hours. The eluent is then replaced by fresh xylene and the boiling is continued for another hour. Subsequently, the mesh is dried and weighed again (mXHU+mm).

The mass of the xylene hot insoluble (mXHU) obtained by the formula (mXHU+mm)−mm=mXHU is put in relation to the weight of the polymer to obtain the fraction of xylene insolubles mXHU/mp.

Material Used:

An ethylene-octene plastomer was used in the experiments. The plastomer is produced in a solution polymerisation process (Compact) using a metallocene catalyst and has the following properties as shown in Table 1.

TABLE 1

| Property | Unit | Value |
|---|---|---|
| Density | Kg/m³ | 882 |
| MFR2 | g/10 min | 85 |

TABLE 1-continued

| Property | Unit | Value |
|---|---|---|
| Melting point | ° C. | 76 |
| C8 content | Wt % | 26.8 |
| C2 content | Wt % | 73.2 |
| MWD | | 2.6 |

Extrusion Conditions:

The plastomer of table 1 was subjected to a one step extrusion process in the presence of a radical initiator, Perkadox 30 (Akzo Nobel) used in a solid state. The extruder used was a Coperion W&P ZSK 32 MC Plus. The temperature profile is set as the following: barrel 1 at 20° C., barrel 2 at 100° C., barrel 3 to 12 at 350° C. and die-plate at 150° C.

The screw speed varies between 450 and 1200 revolutions per minute and throughput is kept in the range of 10-30 kg/hour.

The main polymer is dosed in the main hopper of the extruder. The radical initiator is either dosed at once to the first barrel of the extruder or at both first and sixth barrels at the same time based on half-split of its amount.

The visbroken material exiting the extruder die was taken for MFR measurement.

As the barrel temperature was set at 350° C., the polymer melt temperature coming out of the die was at least 335° C.

Further details of the extrusion process are explained in table 2.

TABLE 2

| Run | Initial MFR2 | Screw speed, rpm | Through-put, kg/h | R.I content at 1st barrel, wt.-% | R.I content at 6st barrel, wt.-% | Melt temperature at die exit, ° C. | Residence time, s | SEI, kWh/kg | Eta (0.05 rad/s) 190° C. Pa · s | Final MFR2 | Cross-linking (XHU), wt.-% |
|---|---|---|---|---|---|---|---|---|---|---|---|
| C1 | 85 | 450 | 20 | | | 340 | 60 | 0.25 | 88 | 116.3 | 0.09 |
| IE1 | 85 | 450 | 20 | 0.2 | | 337 | 60 | 0.25 | 27 | 319.8 | 0.15 |
| IE2 | 85 | 450 | 20 | 0.2 | 0.2 | 338 | 60 | 0.25 | 26 | 337.3 | 0.05 |
| IE3 | 85 | 1200 | 30 | 0.2 | | 349 | 40 | 0.37 | 25 | 433.3 | 0.28 |
| IE4 | 85 | 1200 | 20 | 0.2 | 0.2 | 359 | 40 | 0.37 | 31 | 361.5 | 0.00 |
| IE5 | 85 | 1200 | 20 | 0.4 | 0.4 | 340 | 40 | 0.40 | 17 | 507.0 | 0.01 |

R.I. means Radical Initiator
XHU means Xylol Hot Unsoluble

The examples demonstrate that a final MFR (190° C./2.16 kg) of 500 g/10 min can be achieved based on the starting MFR of 85 g/10 min. Also, final MFR values can be controlled. Higher initiator content leads to higher MFR. Faster screw speed leads to higher MFR. Higher SEI leads to higher MFR.

Examples 6 to 9

The experiment was repeated using different starting plastomers/elastomers but the same general extrusion conditions. The plastomers/elastomers used in example 2 are:
  Ex 6 plastomer density 882 kg/m³ and MFR2 of 85 g/10 min.
  Ex 7+8 plastomer density of 882 kg/m³ and MFR2 of 6.6 g/10 min.
  Ex 9 elastomer density of 870 kg/m³ and MFR2 of 7.0 g/10 min.

These ethylene octene plastomers/elastomers were produced in a solution polymerisation process (Compact) using a metallocene catalyst

TABLE 3

| Run | Density/MFR2 | Screw speed, rpm | Through-put, kg/h | R.I cont at 1st barrel wt.-% | R.I. cont at 6st barrel wt.-% | Melt temperature at die exit, °C | Residence time, s | SEI, kWh/kg | Eta (0.05 rad/s) 190° C. Pa·s | Final MFR2 | Cross-linking (XHU), wt.-% |
|---|---|---|---|---|---|---|---|---|---|---|---|
| IE6 | 882/85 | 1200 | 20 | 0.8 | | 347 | 45 | 0.40 | 14 | 635.6 | |
| IE7 | 882/6.6 | 1200 | 20 | 0.4 | 0.4 | 341 | 44 | 0.50 | 16 | 712.3 | 0.005 |
| IE8 | 882/6.6 | 450 | 10 | 0.4 | 0.4 | 338 | 95 | 0.42 | 24 | 490.1 | 0.005 |
| IE9 | 870/7.0 | 1200 | 20 | 0.8 | | 342 | 46 | 0.46 | 18 | 560.5 | 0.12 |

Examples demonstrate that high MFR values can also be achieved when initial MFR is much lower than 85 g/10 min.

Visual observation of the product was conducted and all visbroken examples had a white shade/colour with an absence of yellowness.

The invention claimed is:

1. A process for increasing the $MFR_2$ of a polyethylene copolymer or an ethylene plastomer or elastomer, the process comprising:
   extruding a copolymer of polyethylene having a density of from 910 to 970 kg/m³ and an $MFR_2$ of from 1 to 100 g/10 min in the presence of from 0.1 to 2 wt % of a radical initiator so as to produce a polyethylene copolymer having an $MFR_2$ of 200 g/10 min or more, or
   extruding an ethylene plastomer or elastomer having a density of from 855 to 910 kg/m³ and an $MFR_2$ of from 0.5 to 100 g/10 min in the presence of 0.1 to 2 wt % of a radical initiator so as to produce an ethylene plastomer or elastomer having an $MFR_2$ of 200 g/10 min or more,
   wherein the radical initiator comprises a non-peroxide radical initiator, a radical initiator which decomposes at a temperature greater than 200° C., or a combination thereof.

2. The process of claim 1, wherein the radical initiator decomposes at a temperature greater than 200° C.

3. The process of claim 1, wherein the extruding is performed by an extruder operated with a screw speed of from 300 to 1400 rpm.

4. The process of claim 1, wherein the produced polyethylene copolymer or ethylene plastomer or elastomer has an $MFR_2$ which is 200 g/10 min or more higher than the $MFR_2$ before extrusion.

5. The process of claim 1, wherein the $MFR_2$ of the polyethylene copolymer or ethylene plastomer or elastomer after extrusion is at least 500 g/10 min.

6. The process of claim 1, wherein the $MFR_2$ of the polyethylene copolymer or ethylene plastomer or elastomer before extrusion is from 1 to 10 g/10 min.

7. The process of claim 1, wherein the extruding is performed by an extruder comprising a barrel, wherein heat is applied to the barrel at a maximum temperature of at least 300° C.

8. The process of claim 3, wherein the screw speed in the extruder is from 300 to 1200 rpm.

9. The process of claim 3, wherein the extruder provides a specific energy input (SEI) of 0.15 kWh/kg or more.

10. The process of claim 1, wherein all of the radical initiator is added at the start of the extrusion.

11. A method comprising using extruder screw speed or radical initiator content to control the $MFR_2$ of a visbroken polyethylene copolymer or ethylene plastomer or elastomer in a process in which:
   a polyethylene copolymer having a density of from 910 to 970 kg/m³ and an $MFR_2$ of from 1 to 100 g/10 min, or
   an ethylene plastomer or elastomer having a density of from 855 to 910 kg/m³ and an $MFR_2$ of from 0.5 to 100 g/10 min
   is extruded in the presence of from 0.1 to 2 wt % of a radical initiator so as to produce: a polyethylene copolymer having an $MFR_2$ of 200 g/10 min or more, or an ethylene plastomer or elastomer having a $MFR_2$ of 200 g/10 min or more.

* * * * *